US007851560B2

(12) United States Patent
Agarwal et al.

(10) Patent No.: US 7,851,560 B2
(45) Date of Patent: *Dec. 14, 2010

(54) POLYESTER-POLYCARBONATE COMPOSITIONS, METHODS OF MANUFACTURE, AND METHODS OF USE

(75) Inventors: Parminder Agarwal, Evansville, IN (US); Rodney W. Fonseca, Newburgh, IN (US); Songping Liao, Shanghai (IN); Hongtao Shi, Shanghai (IN); Peter H. Vollenberg, Evansville, IN (US); Huiping Zhang, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/564,406

(22) Filed: Nov. 29, 2006

(65) Prior Publication Data

US 2007/0129506 A1 Jun. 7, 2007

Related U.S. Application Data

(63) Continuation-in-part of application No. 11/294,074, filed on Dec. 5, 2005, now abandoned.

(51) Int. Cl.
 *C08L 69/00* (2006.01)
 *C08L 67/02* (2006.01)
(52) U.S. Cl. .................. 525/439; 535/446; 535/464
(58) Field of Classification Search ........................ None
 See application file for complete search history.

(56) References Cited

U.S. PATENT DOCUMENTS

| | | | |
|---|---|---|---|
| 2,465,319 A | 3/1949 | Whinfield | |
| 3,047,539 A | 7/1962 | Pengilly | |
| 3,635,895 A | 1/1972 | Kramer | |
| 4,001,184 A | 1/1977 | Scott | |
| 5,488,086 A | 1/1996 | Umeda et al. | |
| 5,637,643 A | 6/1997 | Umeda et al. | |
| 6,458,913 B1 * | 10/2002 | Honigfort et al. | 528/196 |
| 6,727,312 B1 | 4/2004 | Nodera | |
| 6,969,745 B1 | 11/2005 | Taraiya et al. | |
| 2003/0149190 A1 * | 8/2003 | Duan et al. | 525/439 |
| 2003/0195329 A1 * | 10/2003 | Funakoshi et al. | 528/370 |
| 2005/0085589 A1 | 4/2005 | Kim | |
| 2006/0135690 A1 * | 6/2006 | Juikar et al. | 525/67 |
| 2007/0129504 A1 * | 6/2007 | Zhang et al. | 525/446 |
| 2007/0129506 A1 | 6/2007 | Shi et al. | |

FOREIGN PATENT DOCUMENTS

| | | | |
|---|---|---|---|
| EP | 188791 | * | 7/1986 |
| EP | 0537577 A1 | | 4/1993 |
| WO | 2005108489 A1 | | 11/2005 |

OTHER PUBLICATIONS

International Search Report; International Application No. PCT/US2006/046189; Date of Mailing: May 25, 2007.
Written Opinion; International Application No. PCT/US2006/046189; Date of Mailing: May 25, 2007.
JP 06-287433; Publication Date Nov. 10, 1994 (translation of abstract only).

* cited by examiner

*Primary Examiner*—David Buttner
(74) *Attorney, Agent, or Firm*—Cantor Colburn LLP

(57) ABSTRACT

A composition comprising a polysiloxane polycarbonate block copolymer; a cycloaliphatic polyester; and a polycarbonate that is different from the polycarbonate block copolymer, having a weight average molecular weight of less than about 20,000 Daltons. The compositions have high flow at low temperatures and good impact properties. The compositions are useful for the manufacture of components for handheld electronic devises such as cellular telephones.

29 Claims, 1 Drawing Sheet

POLYESTER-POLYCARBONATE COMPOSITIONS, METHODS OF MANUFACTURE, AND METHODS OF USE

CROSS-REFERENCE TO RELATED APPLICATION

This application is a Continuation-in-Part of, and claims priority to, U.S. patent application Ser. No. 11/294,074, filed 5 Dec. 2005, now abandoned which is incorporated by reference herein in its entirety.

BACKGROUND OF THE INVENTION

Transparent blends of polycarbonates and polyester have been known for several decades. Property wise they represent an amalgamation of various properties of the two polymer systems—some properties of one being boosted, but usually at the expense of the other polymer's property. Some of the areas that could use overall improvement are impact, particularly low temperature impact, solvent resistance, and high melt flow. Through the addition of a copolycarbonate system, we have maintained light transmission characteristics of the polycarbonate polyester system while significantly improving its ductility particularly at low temperature, after aging, and in the presence of steam, while having improved solvent resistance to basic organic chemical system.

One application where thermoplastic polycarbonate-polyesters blends are especially useful is in cellular telephones and other personal electronic devices. Due to continuing innovation in function and design, more robust materials are required, but such materials must also meet stringent manufacturing process requirements. For example, current design trends for cellular telephones and other personal electronic devices phones require use of in-mold-decoration (IMD) processes, in-mold-labeling (IML) processes, over-molding (or two-shot molding) processes, and thin-wall molding. Part thickness for these devices has evolved from about 1.5 to 2.0 mm down to 0.8 to 1.2 mm, and even as thin as 0.5 mm. In addition, complicated design structures are required, including lens covers (windows) with curvatures, lens covers with camera holes, integrated lens covers and housings, and the like. Lens covers must be able to provide protection to the devices inside the phone and/or allow see-through.

In IMD (also called "ink transfer" processes), since the carrier for the pattern and the ink pattern itself cannot withstand very high temperatures, materials moldable at lower injection molding temperatures are preferred, to prevent ink washout. The thermoplastic materials also advantageously have high flow, to minimize mold-in stress that can damage the carrier and the printed layer. Lower processing temperatures are also preferred for in-mold labeling (IML) and two-shot molding processes. In two-shot molding processes, it is critical that the thermoplastic material of the second shot has a lower melt temperature than the thermoplastic material of the first shot, to protect the first shot from washout or warpage caused by the hot melt of the second shot. Thin parts not only require high flow but also high impact from the material used. Industrial designers are increasing integrating several of the above design trends into one application, for example a cellular phone cover housing with a camera hole area, a transparent lens area and some geometric features, which is produced by a two-shot molding process, where the first shot is a high-temperature opaque-colored polycarbonate, and the second shot is a low temperature high flow transparent material, which is covered with IMD print and has a wall thickness of about 0.5 mm.

Acrylic resins such as poly(methyl methacrylate) (PMMA) have been used in the foregoing processes, because such resins are transparent and have a process temperature of about 220 to 230° C. However, the brittleness of PMMA and other acrylic-based resins limit their use as cellular phone lenses with curvature designs and complicated structural features. Polycarbonate alone provides high impact strength, but is processed at higher temperatures, usually about 290 to 310° C. Higher flow polycarbonates are available, but show insufficient impact strength for these applications due to the fact that the higher flow is achieved at least in part by using a lower molecular weight polycarbonate. Efforts to increase the flow of polycarbonate-polyester compositions, for example by reducing the molecular weight of the polycarbonate resin, often results in the loss of ductility. There accordingly remains a need in the art for polycarbonate-polyester blends that have high flow at lower temperatures, that can be manufactured to be transparent, and that can maintain good impact properties.

SUMMARY OF THE INVENTION

In accordance with the invention, there is a composition comprising
a. about 5 to about 90 wt % of a polysiloxane polycarbonate block copolymer,
b. about 10 to about 80 wt % of a cycloaliphatic polyester, and
c. zero to about 85 wt % of a polycarbonate.

In another embodiment, a composition comprises based on the total weight of polymer components in the composition, about 2 to about 20 wt % of a polysiloxane polycarbonate block copolymer comprising repeating structural units of formula (I)

wherein at least 60 percent of the total number of $R^1$ groups are aromatic organic radicals and the balance thereof are aliphatic, alicyclic, or aromatic radicals, and repeating structural units of formula (III)

wherein $R^2$ is independently at each occurrence a monovalent organic radical having 1 to 13 carbon atoms, and n is an integer greater than or equal to 1; about 25 to about 80 wt % of a cycloaliphatic polyester having repeating units of formula (VI)

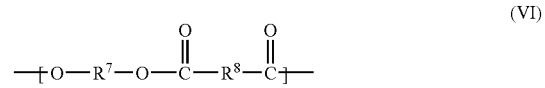

wherein $R^7$ and $R^8$ are independently at each occurrence a divalent aromatic, aliphatic or cycloaliphatic group having 2 to 20 carbon atoms, with the proviso that at least one of $R^7$ and $R^8$ is a cycloaliphatic group-containing radical; and about 10 to about 70 wt % of a polycarbonate that is different from the polycarbonate block copolymer, having a weight average molecular weight of less than about 20,000 Daltons, and that comprises repeating structural units of formula (XVIII)

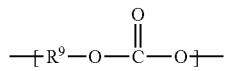

(XVIII)

wherein at least 60 percent of the total number of $R^9$ groups are aromatic organic radicals and the balance thereof are aliphatic, alicyclic, or aromatic radicals; and further wherein the composition has a melt volume rate of about 20 to about 40 cc/10 minutes, measured in accordance with ISO 1133 at 265° C. and 2.16 kgf.

In another embodiment, a composition comprises, based on the total weight of polymer components in the composition, about 3 to about 15 wt % of a polysiloxane polycarbonate block copolymer comprising repeating structural units of formula (I) wherein at least 60 percent of the total number of $R^1$ groups are aromatic organic radicals and the balance thereof are aliphatic, alicyclic, or aromatic radicals, and repeating structural units of formula (III) wherein $R^2$ is independently at each occurrence a monovalent organic radical having 1 to 13 carbon atoms, and n is an integer greater than or equal to 1; about 33 to about 77 wt % of a cycloaliphatic polyester having repeating units of formula (VI) wherein $R^7$ and $R^8$ are independently at each occurrence a cycloaliphatic group-containing radical having from 5 to 20 carbon atoms; and about 17 to about 65 wt % of a polycarbonate that is different from the polycarbonate block copolymer, having a weight average molecular weight of less than about 20,000 Daltons, and that comprises repeating structural units of formula (XVIII) wherein at least 60% of the $R^9$ groups are derived from a bisphenol of formula (XX)

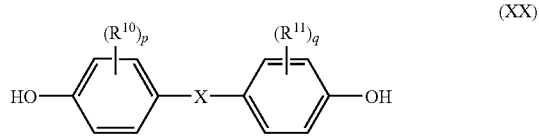

(XX)

wherein $R^{10}$ and $R^{11}$ independently at each occurrence are a halogen atom or a monovalent hydrocarbon group, p and q are each independently integers from 0 to 4, and X represents one of the groups of formula (XXI) or (XXII)

(XXI)

(XXII)

wherein $R^{12}$ and $R^{13}$ independently at each occurrence are a hydrogen atom or a monovalent linear or cyclic hydrocarbon group having 1 to 8 carbons and $R^{14}$ is a divalent hydrocarbon group having 1 to 8 carbons.; and further wherein the composition has a melt volume rate of about 24 to about 35 cc/10 minutes, measured in accordance with ISO 1133 at 265° C. and 2.16 kgf.

In still another embodiment, a composition comprises, based on the total weight of polymer components in the composition, about 4 to about 7 wt % of a polysiloxane polycarbonate block copolymer comprising repeating structural units of formula (I) wherein at least 60 wt % of the $R^1$ groups are derived from bisphenol A; repeating structural units of formula (IV)

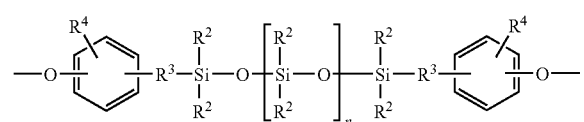

(IV)

wherein $R^2$ is independently at each occurrence a methyl, trifluoropropyl, or phenyl, $R^3$ is propylene, and n is an integer of about 10 to about 100; about 38 to about 70 wt % of poly(1,4-cyclohexane-dimethanol-1,4-dicarboxylate); and about 25 to about 55 wt % of a polycarbonate that is different from the polycarbonate block copolymer, having a weight average molecular weight of less than about 19,000 Daltons, and that comprises repeating structural units of formula (XVIII) wherein at least 60 percent of the total number of $R^9$ groups are derived from bisphenol A; and further wherein the composition has a melt volume rate of about 24 to about 35 cc/10 minutes, measured in accordance with ISO 1133 at 265° C. and 2.16 kgf.

Also disclosed is a method of manufacture of any of the above-described compositions, comprising melt blending the components of the compositions.

Further disclosed is a method of forming an article comprising injection molding, extrusion, injection blow molding, gas assist blow molding, or vacuum forming the above-described compositions to form the article.

In another embodiment, an article comprises one of the above-described compositions.

DETAILED DESCRIPTION OF THE INVENTION

Figure 1:
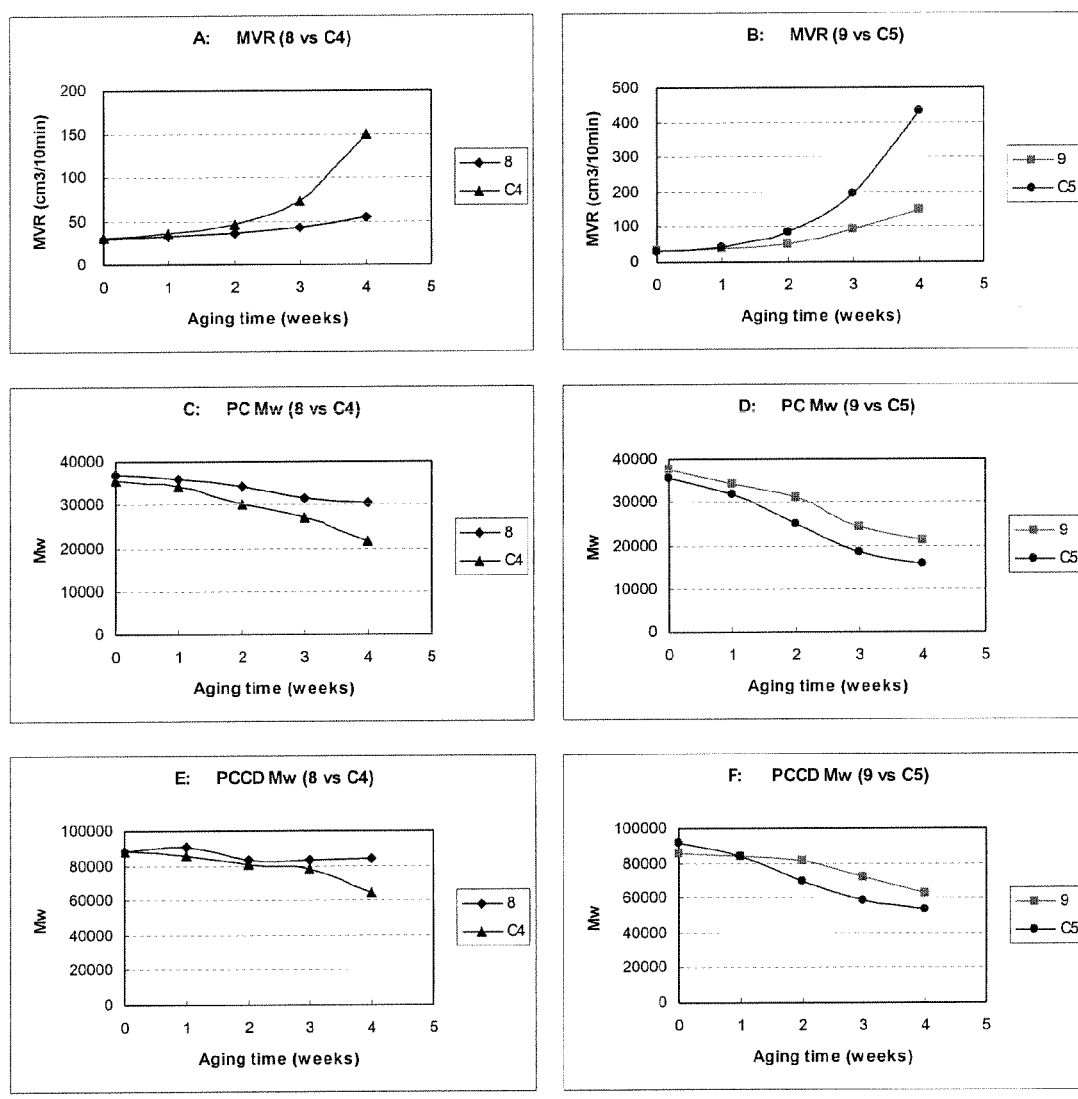
FIG. 1 is six graphs (A-F) illustrating the effect of heat aging on weight average molecular weight of various samples described below.

The inventors have found that a useful balance of properties can be obtained using a blend of a specific type of a polyester, in particular a cycloaliphatic polyester, and a specific type of polycarbonate copolymer, in particular a polycarbonate copolymer containing both aromatic polycarbonate units and polysiloxane units. Such blends have excellent transparency, together with excellent hydrolytic stability, that is, stability over time in the presence of heat and/or humidity. Other properties of the blends can also be maintained, in particular solvent resistance and impact properties, particularly at low temperature.

In another embodiment, it has unexpectedly been found that the properties of the blends, in particular flow at lower processing temperatures, can be improved even further. Such improvements are obtained by use of a polyorganosiloxane/polycarbonate block copolymer having a specific molecular weight range, in particular less than 20,000 Daltons, especially less than 19,000 Daltons. The improvements are obtained without significantly adversely affecting other desirable properties of the polycarbonates, in particular light transmittance and impact properties, particularly at low temperature. These blends are especially useful in the formation of thin, transparent parts, for example transparent cell phone covers.

The singular forms "a", "an", and "the" include plural referents unless the context clearly dictates otherwise. "Optional" or "optionally" as used herein means that the subsequently described event or circumstance may or may not occur, and that the description includes instances where the event occurs and instances where it does not.

The polyorganosiloxane/polycarbonate block copolymer comprises polycarbonate blocks and polyorganosiloxane blocks. The polycarbonate blocks comprise repeating structural units of the formula (I),

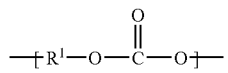
(I)

in which at least 60 percent of the total number of $R^1$ groups are aromatic organic radicals and the balance thereof are aliphatic, alicyclic, or aromatic radicals. $R^1$ may be an aromatic organic radical of the formula (II),

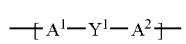
(II)

wherein each of $A^1$ and $A^2$ is a monocyclic divalent aryl radical and $Y^1$ is a bridging radical having one or two atoms which separate $A^1$ from $A^2$. In one embodiment, one atom separates $A^1$ from $A^2$. Illustrative non-limiting examples of radicals of this type include —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be an unsaturated hydrocarbon group or a saturated hydrocarbon group such as methylene, cyclohexylidene, or isopropylidene.

The polyorganosiloxane blocks comprise repeating structural units of the formula (III),

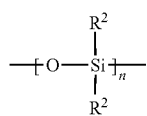
(III)

wherein $R^2$ is independently at each occurrence a monovalent organic radical having 1 to 13 carbon atoms, and "n" is an integer greater than or equal to 1, or, more specifically, greater than or equal to about 10, or, even more specifically, greater than or equal to about 25. In one embodiment n is greater than or equal to about 40. The integer "n" may also be less than or equal to about 1000, or, more specifically, less than or equal to about 100, or, even more specifically, less than or equal to about 75 or, even more specifically less than or equal to about 60. As is readily understood by one of ordinary skill in the art, "n" represents an average value.

In one embodiment, the polyorganosiloxane blocks comprise repeating structural units of the formula (IV),

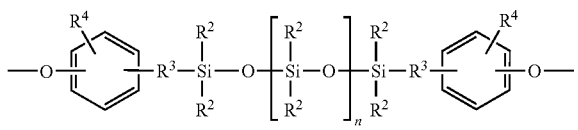
(IV)

wherein $R^2$ and "n" are as defined above. $R^3$ is independently at each occurrence a divalent aliphatic radical having 1 to 8 carbon atoms or aromatic radical having 6 to 8 carbon atoms. In one embodiment each occurrence of $R^3$ is in the ortho or para position relative to the oxygen. $R^4$ is independently at each occurrence a hydrogen, halogen, alkoxy having 1 to 8 carbon atoms, alkyl having 1 to 8 carbon atoms or aryl having 6 to 13 carbon atoms and "n" is an integer less than or equal to about 1000, specifically less than or equal to about 100, or, more specifically, less than or equal to about 75 or, even more specifically, less than or equal to about 60. As is readily understood by one of ordinary skill in the art, n represents an average value.

In one embodiment in the above formula (IV), $R^2$ is independently at each occurrence an alkyl radical having 1 to 8 carbons, $R^3$ is independently at each occurrence a dimethylene, trimethylene or tetramethylene, $R^4$ is independently at each occurrence a halogen radical, such as bromo and chloro; alkyl radical such as methyl, ethyl, and propyl; alkoxy radical such as methoxy, ethoxy, and propoxy; aryl radical such as phenyl, chlorophenyl, and tolyl. In one embodiment $R^3$ is methyl, a mixture of methyl and trifluoropropyl, or a mixture of methyl and phenyl.

The polyorganosiloxane/polycarbonate copolymers may have a -average molecular weight (, measured, for example, by ultra-centrifugation or light scattering, of greater than or equal to about 10,000 to about 200,000, or, more specifically, about 20,000 to about 100,000. It is generally desirable to have polydimethylsiloxane units contribute about 0.5 to about 80 weight percent of the total weight of the polyorganosiloxane/polycarbonate copolymer or an equal molar amount of other polydiorganosiloxane. Even more specific is a range of about 1 to about 10 weight percent of siloxane units in the polyorganosiloxane/polycarbonate copolymer.

The polyorganosiloxane/polycarbonate block copolymer comprises polyorganosiloxane domains having an average domain size of less than or equal to 45 nanometers. Within this range the polyorganosiloxane domains may be greater than or equal to about 5 nanometers. Also within this range the polyorganosiloxane domains may be less than or equal to about 40 nanometers, or, more specifically, less than or equal to about 10 nanometers.

Domain size may be determined by Transmission Electron Microscopy (TEM) as follows. A sample of the polyorganosiloxane/polycarbonate block copolymer is injection molded into a sample 60 millimeters square and having a thickness of 3.2 millimeters. A block (5 millimeters by 10 millimeters) is cut from the middle of the sample. The block is then sectioned from top to bottom by an ultra microtome using a diamond knife at room temperature. The sections are 100 nanometers thick. At least 5 sections are scanned by TEM at 100 to 120 kilovolts (kV) and the images recorded at 66,000× magnification. The polysiloxane domains were counted and measured, the domain size reflecting the longest single linear dimension of each domain. The domain sizes over the 5 sections were then averaged to yield the average domain size.

Also specifically envisioned are polyorganosiloxane/polycarbonate block copolymers prepared by direct synthesis comprising a polycarbonate matrix and the desired embedded polysiloxane domains. In a blend of two polyorganosiloxane/ polycarbonate copolymers the individual copolymers are generally difficult to separate or to distinguish. With Transmission Electron Microscopy (TEM) it is however possible to distinguish in the blend a polycarbonate matrix and embedded polysiloxane domains.

Polyorganosiloxane/polycarbonate copolymers may be made by a variety of methods such as interfacial polymerization, melt polymerization, and solid-state polymerization. For example, the polyorganosiloxane/polycarbonate copolymers may be made by introducing phosgene under interfacial reaction conditions into a mixture of a dihydric aromatic compound, such as bisphenol A (hereinafter at times referred to as BPA), and a hydroxyaryl-terminated polyorganosiloxane. The polymerization of the reactants may be facilitated by use of a tertiary amine catalyst or a phase transfer catalyst.

The hydroxyaryl-terminated polyorganosiloxane may be made by effecting a platinum catalyzed addition between a siloxane hydride of the formula (V),

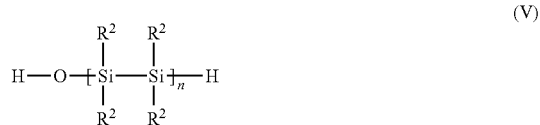

(V)

and an aliphatically unsaturated monohydric phenol wherein $R^2$ and n are as previously defined.

Non-limiting examples of the aliphatically unsaturated monohydric phenols, which may be used to make the hydroxyaryl-terminated polyorganosiloxanes include, for example, 4-allyl-2-methoxy phenol (herein after referred to as eugenol); 2-alkylphenol, 4-allyl-2-methylphenol; 4-allyl-2-phenylphenol; 4-allyl-2-bromophenol; 4-allyl-2-t-butoxyphenol; 4-phenyl-2-phenylphenol; 2-methyl-4-propylphenol; 2-allyl-4,6-dimethylphenol; 2-allyl-4-bromo-6-methylphenol; 2-allyl-6-methoxy-4-methylphenol and 2-allyl-4,6-dimethylphenol. Mixtures of aliphatically unsaturated monohydric phenols may also be used.

Among the suitable phase transfer catalysts which may be utilized are catalysts of the formula $(R^5)_4Q^+X$, where $R^5$ is independently at each occurrence an alkyl group having 1 to 10 carbons, Q is a nitrogen or phosphorus atom, and X is a halogen atom, or an $—OR^6$ group, where $R^6$ is selected from a hydrogen, an alkyl group having 1 to 8 carbon atoms and an aryl group having 6 to 18 carbon atoms. Some of the phase transfer catalysts which may be used include $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$ wherein X is selected from $Cl^-$, $Br^-$ or $—OR^6$. Mixtures of phase transfer catalysts may also be used. An effective amount of a phase transfer catalyst is greater than or equal to 0.1 weight percent (wt %) and in one embodiment greater than or equal to 0.5 wt % based on the weight of bisphenol in the phosgenation mixture. The amount of phase transfer catalyst may be less than or equal to about 10 wt % and more specifically less than or equal to 2 wt % based on the weight of bisphenol in the phosgenation mixture.

Non-limiting examples of dihydric aromatic compounds which may be subjected to phosgenation include, resorcinol; 4-bromoresorcinol; hydroquinone; 4,4'-dihydroxybiphenyl; 1,6-dihydroxynaphthalene; 2,6-dihydroxynaphthalene; bis (4-hydroxyphenyl)methane; bis(4-hydroxyphenyl)diphenylmethane; bis(4-hydroxyphenyl)-1-naphthylmethane; 1,1-bis (4-hydroxyphenyl)methane; 1,1-bis(4-hydroxyphenyl) ethane; 1,2-bis(4-hydroxyphenyl)ethane; 1,1-bis(4-hydroxyphenyl)-1-phenylethane; 2,2-bis(4-hydroxyphenyl) propane; 2-(4-hydroxyphenyl)-2-)3-hydroxyphenyl) propane; 2,2-bis(4-hydroxyphenyl)butane; 2,2-bis(4-hydroxyphenyl) octane; 1,1-bis(4-hydroxyphenyl)propane; 1,1-bis(4-hydroxyphenyl)n-butane; bis(4-hydroxyphenyl) phenylmethane; 2,2-bis(4-hydroxy-1-methylphenyl) propane; 1,1-bis(4-hydroxy-tert-butylphenyl)propane; 2,2-bis (4-hydroxy-3-bromophenyl)propane; 1,1-bis (hydroxyphenyl)cyclopentane; 1,1-bis(4-hydroxyphenyl)cyclohexane; 1,1-bis(4-hydroxyphenyl)isobutene; 1,1-bis(4-hydroxyphenyl)cyclododecane; trans-2,3-bis(4-hydroxyphenyl)-2-butene; 2,2-bis(4-hydroxyphenyl)adamantine; (alpha, alpha'-bis(4-hydroxyphenyl)toluene, bis(4-hydroxyphenyl)acetonitrile; 2,2-bis(3-methyl-4-hydroxyphenyl) propane; 2,2-bis(3-ethyl-4-hydroxyphenyl)propane; 2,2-bis (3-n-propyl-4-hydroxyphenyl)propane; 2,2-bis(3-isopropyl-4-hydroxyphenyl)propane; 2,2-bis(3-sec-butyl-4-hydroxyphenyl)propane; 2,2-bis(3-t-butyl-4-hydroxyphenyl)propane; 2,2-bis(3-cyclohexyl-4-hydroxyphenyl)propane; 2,2-bis(3-allyl-4-hydroxyphenyl) propane; 2,2-bis(3-methoxy-4-hydroxyphenyl)propane; 2,2-bis(4-hydroxyphenyl)hexafluoropropane; 1,1-dichloro-2,2-bis(4-hydroxyphenyl)ethylene; 1,1-dibromo-2,2-bis(4-hydroxyphenyl)ethylene; 1,1-dichloro-2,2-bis(5-phenoxy-4-hydroxyphenyl)ethylene; 4,4'-dihydroxybenzophenone; 3,3-bis(4-hydroxyphenyl)-2-butanone; 1,6-bis(4-hydroxyphenyl)-1,6-hexanedione; ethylene glycol bis(4-hydroxyphenyl)ether; bis(4-hydroxyphenyl)ether; bis(4-hydroxyphenyl)sulfide; bis(4-hydroxyphenyl)sulfoxide; bis (4-hydroxyphenyl)sulfone; 9,9-bis(4-hydroxyphenyl) fluorine; 2,7-dihydroxypyrene; 6,6'-dihydroxy-3,3,3',3'-tetramethylspiro(bis)indane("spirobiindane bisphenol"); 3,3-bis(4-hydroxyphenyl)phthalide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene and 2,7-dihydroxycarbazole. Mixtures of dihydric aromatic compounds may also be used.

The polyorganosiloxane/polycarbonate block copolymer may be produced by blending aromatic dihydroxy compound with an organic solvent and an effective amount of phase transfer catalyst or an aliphatic tertiary amine, such as triethylamine, under interfacial conditions. Sufficient alkali metal hydroxide may be utilized to raise the pH of the bisphenol reaction mixture prior to phosgenation, to 10.5 pH. This may result in the dissolution of some of the bisphenol into the aqueous phase. Suitable organic solvents that may be used are, for example, chlorinated aliphatic hydrocarbons, such as methylene chloride, chloroform, carbon tetrachloride, dichloroethane, trichloroethane, tetrachloroethane, dichloropropane, and 1,2-dichloroethylene; substituted aromatic hydrocarbons such as chlorobenzene, o-dichlorobenzene, and the various chlorotoluenes. Mixtures of organic solvents may also be used. In one embodiment the solvent comprises methylene chloride.

Aqueous alkali metal hydroxide or alkaline earth metal hydroxide addition may be used to maintain the pH of the phosgenation mixture near the pH set point, which may be in the range of 10 to 12. Some of the alkali metal or alkaline earth metal hydroxides, which may be employed, are for example, sodium hydroxide, potassium hydroxide, and calcium hydroxide. In one embodiment the alkali metal hydroxide used comprises sodium hydroxide.

During the course of phosgene introduction at a pH of 10 to 12, and depending upon the rate of phosgene addition, the pH may be lowered to allow for the introduction of the hydroxyaryl-terminated polyorganosiloxane. End-capping agents such as phenol, p-butylphenol, p-cumylphenol, octylphenol, nonylphenol, and other mono hydroxy aromatic compounds may be used to regulate the molecular weight or to terminate the reaction.

Alternatively the polyorganosiloxane/polycarbonate copolymer may be produced by an aromatic dihydroxy compound in the presence of a phase transfer catalyst at a pH of 5 to 8 to form bischloroformate oligomers. Then to this is added a hydroxyaryl-terminated polyorganosiloxane, which is allowed to react at a pH of 9 to 12 for a period of time sufficient to effect the reaction between the bischloroformate oligomers and the hydroxyaryl-terminated polydiorganosiloxane, typically a time period of 10 to 45 minutes. Generally there is a large molar excess of chloroformate groups relative to hydroxyaryl groups. The remaining aromatic dihydroxy compound is then added, and the disappearance of chloroformates is monitored, usually by phosgene paper. When substantially all chloroformates have reacted, an end-capping agent and optionally a trialkylamine are added and the reaction phosgenated to completion at a pH of 9 to 12.

The polyorganosiloxane/polycarbonate copolymer may be made in a wide variety of batch, semi-batch or continuous reactors. Such reactors are, for example, stirred tank, agitated column, tube, and recirculating loop reactors. Recovery of the polyorganosiloxane/polycarbonate copolymer may be achieved by any means known in the art such as through the use of an anti-solvent, steam precipitation or a combination of anti-solvent and steam precipitation.

The thermoplastic composition may comprise blends of two or more polyorganosiloxane/polycarbonate block copolymers. These block copolymers are transparent or translucent.

The cycloaliphatic polyester in the thermoplastic composition comprises a polyester having repeating units of the formula VI,

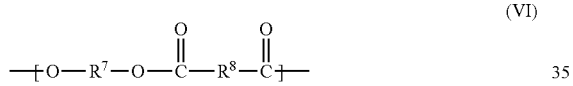

(VI)

wherein $R^7$ and $R^8$ are independently at each occurrence an aryl, aliphatic or cycloalkane having 2 to 20 carbon atoms and chemical equivalents thereof, with the proviso that at least one of $R^7$ and $R^8$ is a cycloalkyl containing radical. The cycloaliphatic polyester is a condensation product where $R^7$ is the residue of a diol or chemical equivalents and $R^8$ is decarboxylated residue of a diacid or chemical equivalents. In one embodiment cycloaliphatic polyesters are those wherein both $R^7$ and $R^8$ are cycloaliphatic-containing radicals.

Cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols.

The cycloaliphatic polyesters may be obtained through the condensation or ester interchange polymerization of the diol or diol chemical equivalent component with the diacid or diacid chemical equivalent component.

In one embodiment $R^7$ and $R^8$ are cycloalkyl radicals independently selected from the following formulae VII to XVI.

(VII)

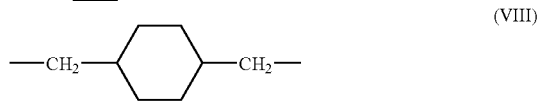

(VIII)

-continued

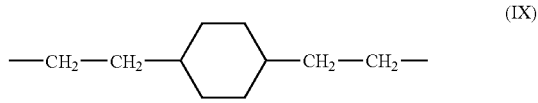

(IX)

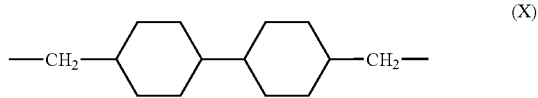

(X)

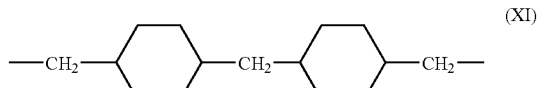

(XI)

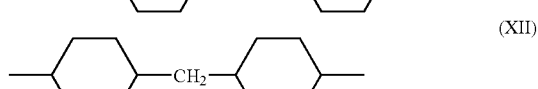

(XII)

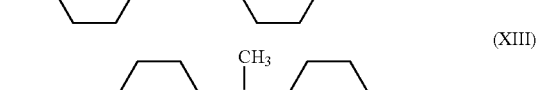

(XIII)

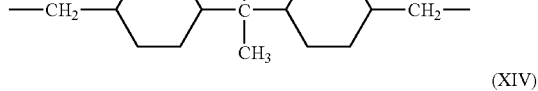

(XIV)

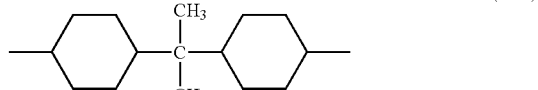

(XV)

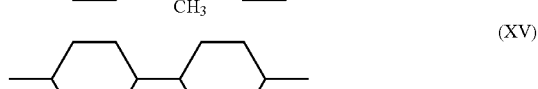

(XVI)

In one embodiment the cycloaliphatic radical $R^8$ is derived from the 1,4-cyclohexyl diacids with generally greater than about 70 mole % thereof in the form of the trans isomer and the cycloaliphatic radical $R^7$ is derived from the 1,4-cyclohexyl primary diols such as 1,4-cyclohexyl dimethanol with greater than about 70 mole % thereof in the form of the trans isomer. The cycloaliphatic polyesters have a weight-average molecular weight (Mw), measured, for example, by ultra-centrifugation or light scattering, of about 25,000 Daltons to about 85,000 Daltons. The weight average molecular weight is more specifically about 30,000 Daltons to about 80,000 Daltons and most specifically about 60,000 to about 80,000 Daltons.

Other diols that may be used in the preparation of the cycloaliphatic polyester are straight chain, branched, or cycloaliphatic alkane diols and may contain 2 to 20 carbon atoms. Examples of such diols include, but are not limited to, ethylene glycol; propylene glycol, i.e., 1,2- and 1,3-propylene glycol; 2,2-dimethyl-1,3-propane diol; 2-ethyl-2-methyl-1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD); triethylene glycol; 1,10-decane diol; and mixtures of any of the foregoing. In one embodiment the diol or chemical equivalent thereof used is 1,4-cyclohexane dimethanol or its chemical equivalents.

Chemical equivalents of the diols include esters, such as dialkylesters, diaryl esters, and the like.

In one embodiment the diacids are cycloaliphatic diacids. This is includes carboxylic acids having two carboxyl groups each of which is attached to a saturated carbon. Specific diacids are cyclo or bicyclo aliphatic acids, non-limiting examples of which include, decahydro naphthalene dicarboxylic acids, norbornene dicarboxylic acids, bicyclo octane dicarboxylic acids, 1,4-cyclohexanedicarboxylic acid, or chemical equivalents. Most specifically the diacids include trans-1,4-cyclohexanedicarboxylic acid or chemical equivalent. Linear dicarboxylic acids like adipic acid, azelaic acid, dicarboxyl dodecanoic acid, and succinic acid may also be useful.

In a further embodiment the diacids are aromatic diacids, for example, terephthalic acid and isophthalic acid. Cycloaliphatic or linear aliphatic diacids can be also employed in a mixture with the aromatic diacids. Terephthalic and isophthalic acids are preferred, most desirably being terephthalic acid. When there is no cycloaliphatic diacid being employed, then at least some of the diols must be cycloaliphatic diol. Various such diols have been disclosed and can be employed, the most desirable one being 1,4-cyclohexanedimethanol, as previously disclosed. Various polymers can be used with this dimethanol, particularly those with terephthalic acid such as those with low levels of cyclohexanedimethanol and high levels of ethylene glycol such as PETG, high levels of cyclohexanedimethanol and low levels of ethylene glycol such as PCTG, and all cyclohexanedimethanol such as PCT. Other aliphatic diols can be used such as butylene glycol or propylene glycol together with the cyclohexanedimethanol and other cycloaliphatic diols as previously mentioned. PETG, PCTG, and PCT are the most desirable.

Cyclohexane dicarboxylic acids and their chemical equivalents may be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. They may also be prepared by the use of an inert liquid medium in which a phthalic acid is at least partially soluble under reaction conditions and with a catalyst of palladium or ruthenium on carbon or silica.

Typically, in the hydrogenation, two isomers are obtained in which the carboxylic acid groups are in cis- or trans-positions. The cis- and trans-isomers may be separated by crystallization with or without a solvent, for example, using n-heptane, or by distillation. The cis- and trans-isomers have different physical properties and may be used independently or as a mixture. Mixtures of the cis- and trans-isomers are useful herein as well.

When the mixture of isomers or more than one diacid or diol is used, a copolyester or a mixture of two polyesters may be used as the cycloaliphatic polyester.

Chemical equivalents of these diacids may include esters, alkyl esters, e.g., dialkyl esters, diaryl esters, anhydrides, salts, acid chlorides, acid bromides, and the like. In one embodiment the chemical equivalent comprises the dialkyl esters of the cycloaliphatic diacids, and most specifically the chemical equivalent comprises the dimethyl ester of the acid, such as dimethyl-1,4-cyclohexane-dicarboxylate.

In one embodiment the cycloaliphatic polyester is poly (cyclohexane-1,4-dimethylene cyclohexane-1,4-dicarboxylate) also referred to as poly(1,4-cyclohexane-dimethanol-1,4-dicarboxylate) (hereinafter referred to as PCCD) which has recurring units of formula XVII,

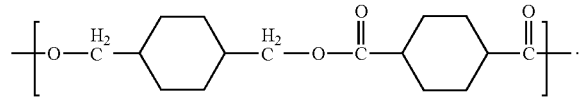

With reference to formula VI for PCCD, $R^7$ is derived from 1,4-cyclohexane dimethanol; and $R^8$ is a cyclohexane ring derived from cyclohexanedicarboxylate or a chemical equivalent thereof. The favored PCCD has a cis/trans formula.

The polyester polymerization reaction may be run in melt in the presence of a suitable catalyst such as a tetrakis (2-ethyl hexyl) titanate, in a suitable amount, generally 50 to 200 ppm of titanium based upon the total weight of the polymerization mixture.

In one embodiment the cycloaliphatic polyester has a glass transition temperature (Tg) greater than or equal to about 50° C., or, more specifically greater than or equal to about 80° C., or, even more specifically, greater than or equal to about 100° C.

Also contemplated herein are the above polyesters with 1 to about 50 percent by weight of units derived from polymeric aliphatic acids and/or polymeric aliphatic polyols to form copolyesters. The aliphatic polyols include glycols, such as poly(ethylene glycol) or poly(butylene glycol). Such polyesters may be made in accordance with the processes disclosed in for example, U.S. Pat. Nos. 2,465,319 and 3,047,539.

The thermoplastic composition optionally further comprises a polycarbonate resin. Polycarbonate resins comprise repeating structural units of the formula XVIII,

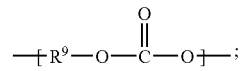

in which at least 60 percent of the total number of $R^9$ groups are aromatic organic radicals and the balance thereof are aliphatic, alicyclic, or aromatic radicals. In one embodiment, $R^9$ is an aromatic organic radical and, more specifically, a radical of the formula (XIX), $$-A^3-Y^2-A^4- \qquad (XIX);$$

wherein each of $A^3$ and $A^4$ is a monocyclic divalent aryl radical and $Y^2$ is a bridging radical having one or two atoms which separate $A^3$ from $A^4$. In an exemplary embodiment, one atom separates $A^3$ from $A^4$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^2$ may be a hydrocarbon group or a saturated hydrocarbon group such as methylene, cyclohexylidene, or isopropylidene.

Polycarbonates may be produced by the interfacial reaction of dihydroxy compounds in which only one atom separates $A^3$ and $A^4$. As used herein, the term "dihydroxy compound" includes, for example, bisphenol compounds having general formula XX as follows:

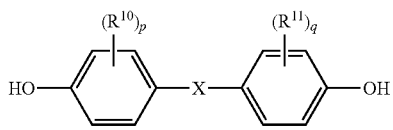

(XX)

wherein $R^{10}$ and $R^{11}$ independently at each occurrence are a halogen atom or a monovalent hydrocarbon group; p and q are each independently integers from 0 to 4; and X represents one of the groups of formula XXI or XXII,

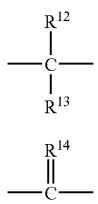

(XXI)

(XXII)

wherein $R^{12}$ and $R^{13}$ independently at each occurrence are a hydrogen atom or a monovalent linear or cyclic hydrocarbon group having 1 to 8 carbons and $R^{14}$ is a divalent hydrocarbon group having 1 to 8 carbons.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of dihydroxy compounds includes the following: resorcinol; 4-bromoresorcinol; hydroquinone; 4,4'-dihydroxybiphenyl; 1,6-dihydroxynaphthalene; 2,6-dihydroxynaphthalene; bis(4-hydroxyphenyl) methane; bis(4-hydroxyphenyl)diphenylmethane; bis(4-hydroxyphenyl)-1-naphthylmethane; 1,1-bis(4-hydroxyphenyl)methane; 1,1-bis(4-hydroxyphenyl)ethane; 1,2-bis(4-hydroxyphenyl)ethane; 1,1-bis(4-hydroxyphenyl)-1-phenylethane; 2,2-bis(4-hydroxyphenyl)propane; 2-(4-hydroxyphenyl)-2-)3-hydroxyphenyl)propane; 2,2-bis(4-hydroxyphenyl)butane; 2,2-bis(4-hydroxyphenyl) octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl) propane; 1,1-bis(4-hydroxy-tert-butylphenyl)propane; 2,2-bis(4-hydroxy-3-bromophenyl) propane; 1,1-bis (hydroxyphenyl)cyclopentane; 1,1-bis(4-hydroxyphenyl)cyclohexane; 1,1-bis(4-hydroxyphenyl)isobutene; 1,1-bis(4-hydroxyphenyl)cyclododecane; trans-2,3-bis(4-hydroxyphenyl)-2-butene; 2,2-bis(4-hydroxyphenyl)adamantine; (alpha, alpha'-bis(4-hydroxyphenyl)toluene. bis(4-hydroxyphenyl)acetonitrile; 2,2-bis(3-methyl-4-hydroxyphenyl)propane; 2,2-bis(3-ethyl-4-hydroxyphenyl)propane; 2,2-bis(3-n-propyl-4-hydroxyphenyl)propane; 2,2-bis(3-isopropyl-4-hydroxyphenyl)propane; 2,2-bis(3-sec-butyl-4-hydroxyphenyl)propane; 2,2-bis(3-t-butyl-4-hydroxyphenyl)propane; 2,2-bis(3-cyclohexyl-4-hydroxyphenyl)propane; 2,2-bis(3-allyl-4-hydroxyphenyl)propane; 2,2-bis(3-methoxy-4-hydroxyphenyl) propane; 2,2-bis(4-hydroxyphenyl)hexafluoropropane; 1,1-dichloro-2,2-bis(4-hydroxyphenyl)ethylene; 1,1-dibromo-2,2-bis(4-hydroxyphenyl)ethylene; 1,1-dichloro-2,2-bis(5-phenoxy-4-hydroxyphenyl)ethylene; 4,4'-dihydroxybenzophenone; 3,3-bis(4-hydroxyphenyl)-2-butanone; 1,6-bis(4-hydroxyphenyl)-1,6-hexanedione; ethylene glycol bis(4-hydroxyphenyl)ether; bis(4-hydroxyphenyl)ether; bis(4-hydroxyphenyl)sulfide; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane ("spirobiindane bisphenol"); 3,3-bis(4-hydroxyphenyl) phthalide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene and 2,7-dihydroxycarbazole. Mixtures of dihydroxy compounds may also be used.

It is also possible to employ two or more different dihydroxy compounds or a copolymer of a dihydric phenol with a glycol or with a hydroxy-terminated or acid-terminated polyester or with a dibasic acid or hydroxy acid in the event a carbonate copolymer rather than a homopolymer is desired for use. Polyarylates and polyester-carbonate resins or their blends may also be employed. Branched polycarbonates as well as blends of linear polycarbonate and a branched polycarbonate may be employed. The branched polycarbonates may be prepared by adding a branching agent during polymerization.

These branching agents are well known and may comprise polyfunctional organic compounds containing at least three functional groups, which may be hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of 0.05-2.0 weight percent. Branching agents and procedures for making branched polycarbonates are described in U.S. Pat. Nos. 3,635,895 and 4,001,184. Many types of polycarbonates end groups may be used in the polycarbonate composition.

In one embodiment polycarbonates are based on bisphenol A compound with formula XIX, in which each of $A^3$ and $A^4$ is p-phenylene and $Y^2$ is isopropylidene. The weight average molecular weight of the polycarbonate may be about 5,000 to about 100,000 daltons, or, more specifically about 10,000 to about 65,000 daltons, or, even more specifically, about 15,000 to about 35,000 daltons.

The components of the composition can be present in the following amounts. Polysiloxane polycarbonate copolymer can be present in an amount of about 5 to about 90 wt % of the composition. Within this range, the copolymer can be present in an amount greater than or equal to about 15 wt %. Also within this range, the copolymer can be present in an amount less than or equal to about 60 wt %. The cycloaliphatic polyester can be present in the composition in an amount of about 10 to about 80 wt %. The polyester can be present in amounts greater than about 15 wt % and can be present in amounts less than about 50 wt %. The polycarbonate need not be present in the composition but, if it is present, should not exceed quantities of about 85 wt % of the composition. A quantity of greater than or about 5 wt % of the composition can be employed. The polycarbonate when present is generally less than about 70 wt %.

Parts made from the compositions of this invention are translucent or transparent. Transparent is measured as >70% transmission using ASTM D1003. Translucency is an appearance state between complete opacity and complete transparency.

The addition of the polysiloxane/polycarbonate block copolymer to the cycloaliphatic polyester blend brings about the following benefits: increased long term impact performance, better low temperature ductility, and certain specific chemical resistance.

In a specific embodiment, it has been found that use of a polycarbonate having a weight average molecular weight (Mw) of less than about 19,000 Daltons (19 KiloDaltons, or KDa) and the block copolymer provides blends that have high flow at lower temperatures, without significantly adversely affecting the other desirable properties of the compositions, such as impact, ductility, transparency, and/or hydrolytic stability. The polycarbonates can also have an Mw of 15 to 19 KDa, specifically 17 to 18 KDa. The block copolymer can also have an Mw of 18 to 24 KDa.

In one embodiment, use of a polycarbonate having an Mw of less than about 19 KDa and the block copolymer provides a composition that imparts equivalent transparency and impact resistance, an improvement in melt flow of about 60 to about 80%, as compared to the same composition containing polycarbonates having higher molecular weights instead of the polycarbonate having molecular weight less than 19 KDa, when measured at 265° C., using a 2.16 Kg weight in accordance with ISO 1133.

Such compositions can also have equivalent impact properties such as Notched Izod ductility, Notched Izod impact strength at room temperature and at low temperature, as well as heat deflection temperatures, that are comparable to the same compositions with polycarbonates having higher molecular weights. This result is surprising, because replacement of high molecular weight polycarbonates with lower molecular weight polycarbonates often adversely affects impact properties.

For example, when measured at 23° C. in accordance with ASTM-D256, an article such as a molded bar comprising the compositions and having a thickness of 3.2 mm has a Notched Izod impact strength of about 800 to about 1600 J/m. In addition, or alternatively, an article such as a molded bar comprising the compositions and having a thickness of 3.2 mm can have a Notched Izod impact strength of about 100 to about 1000 J/m, measured in accordance with ASTM D-256 at 0° C.

An article such as a molded sample comprising the compositions and having a thickness of 3.2 mm can have a heat deflection temperature of about 60 to about 90° C.

Substitutions of the higher molecular weight polycarbonate with the lower molecular weight polycarbonate and the block copolymer also do not substantially adversely impact the light transmittance of the compositions. An article molded from the composition and having a thickness of 2.5 mm has a haze of less than or equal to 5% and/or a transparency of greater than or equal to 80%, each measured according to ASTM D1003-00.

In this embodiment, the compositions comprise about 2 to about 20 wt % of polysiloxane/polycarbonate block copolymer, about 25 to about 80 wt % of cycloaliphatic polyester, and about 10 to about 70 wt % of the polycarbonate having an Mw of less than about 20 KDa. Alternatively, the compositions comprise about 3 to about 15 wt % of the polysiloxane/polycarbonate block copolymer, about 33 to about 77 wt % of the cycloaliphatic polyester, and about 17 to about 65 wt % of the polycarbonate having an Mw of less than about 19 KDa. In still another embodiment, the compositions comprise about 4 to about 7 wt % of the polysiloxane/polycarbonate block copolymer, about 38 to about 70 wt % of the cycloaliphatic polyester, and about 25 to about 55 wt % of the polycarbonate having an Mw of less than about 19 KDa.

To prepare the resin composition, the components may be mixed by any known methods. Typically, there are two distinct mixing steps: a premixing step and a melt mixing ("melt blending") step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device. The examples are extruded using a twin screw type extruder, where the mean residence time of the material is from about 20 s to about 30 s, and where the temperature of the different extruder zones is from about 230° C. to about 290° C.

The compositions may be shaped into a final article by various techniques known in the art such as injection molding, extrusion, injection blow molding, gas assist blow molding, or vacuum forming.

The above-described compositions are especially useful in the manufacture of articles made using IMD, IML, two-shot processes, thin parts, or any combination comprising at least one of the foregoing processes. The impact properties of the compositions are similar to that of polycarbonate. The high flow at lower processing temperatures (e.g., about 250 to about 270° C.) better protects ink patterns, labels, or parts.

Use of the compositions with lower molecular weight polycarbonates are even more useful in some applications, because they can have high flow at even lower processing temperatures (e.g., as low as about 230° C.), without a significant decrease in impact properties. These compositions accordingly provide a good balance among transparency, high flow, low processing temperature, and impact.

The compositions are thus useful in the manufacture of components of hand-held electronic devices such as personal digital assistants and cellular telephones, in particular lens and combinations of lenses and covers. Other structural features that can be present include camera lens holes, curvatures, snap fixes, hollow-out areas, thin ribs or rings and other geometric structures.

For the test samples below, the compositions are injection molded using a VanDorn 85 or a Fanuc S-2000i with melt temperature set at 250 to 310 C. or 250-270° C., mold temperature set at 60° C., and cycle time from 30 to 35 s unless otherwise noted.

The following tests were run on the examples.

From the granulate, the melt volume rate (MVR) was measured according to ISO 1133 (300 C./1.2 kg or 265° C./2.16 Kg, unless otherwise stated) in units of $cm^3/10$ min.

Optical properties (transmission) are measured according to ASTM D 1003 with 3.2 mm or 2.5 mm thick plaques.

Notched Izod impact strength (INI) is measured according to ASTM D256 with 3.2 mm thick Izod bars at various temperatures.

Thermal aging performance: the Izod bars are heated at 90° C. for 15 hours in any oven, then tested with INI at 23° C. according to ASTM D256. The retention of INI after annealing is utilized to characterize the thermal aging performance of a material.

Autoclave: the Izod bars are placed in any autoclave or steam sterilizer (e.g., Napco sterilizer) at 120° C. for 3.3 and 6.7 hours, respectively, then tested with INI at 23° C. according to ASTM D256. The retention of INI after autoclaving is utilized to characterize the autoclavability of a material.

Chemical Resistance: Chemical resistance against various solvents is studied. A composition having 0.3% alkyl dimethyl benzyl ammonium chloride, 0.5-5% ethylene glycol, buffered to pH 11.6 in water is tested. The test is carried out according to ISO 4599. The following test conditions are used: Duration of the test: 48 hours; Test temperature: 23° C.; Applied constant strain: 0.5%. The method of contact: immersion. After the test, the tensile test procedure according to the ASTM D638 standard is performed to determine the physical properties. The sample is considered compatible to the chemical (or resistant to the chemical) if the retention of tensile elongation at break is equal or above 80%; considered marginal if the elongation retention is between 65 and 79%; and considered incompatible if the elongation retention is below 64%.

In the following examples, "PC" refers to a polycarbonate derived from bisphenol A. The polyorganosiloxane/polycarbonate copolymer is represented by "t-EXL" or "PC-siloxane copolymer" and contains 6 wt % siloxane units derived from a diol of formula (IV) wherein $R^2$ is methyl, $R^3$ is propylene, and $R^4$ is methoxy.

Below in Table 1 are examples of the invention together with control examples without the polycarbonate polysiloxane block copolymer. C1, C2, and C3 are comparative examples.

heating at 90° C. for 15 hours, the INI is substantially retained, particularly with PCTG. The INI retention after autoclaving is also high in the tested invention compositions. With respect to solvent resistance against a specific basic material, the PCT containing compositions demonstrate very little deterioration, if any.

The Examples in Table 2 illustrate the effect of varying the molecular weight of the polycarbonate in the polyester and copolycarbonate blend, and the importance of including the polyorganosiloxane/polycarbonate copolymer. Comparative Example C4 corresponds to Example 8 without the polysiloxane copolymer; Comparative Example C5 corresponds to Example 9 without the copolymer. Comparative example C6 contains polycarbonates having weight average molecular

TABLE 1

|  | C1 | C2 | C3 | 1 | 2 | 3 | 4 | 5 | 6 | 7 |
|---|---|---|---|---|---|---|---|---|---|---|
| Formulations |  |  |  |  |  |  |  |  |  |  |
| PC, Mw = 36 KDa | 74.2 | 0 | 49.9 | 28.1 | 0 | 54.2 | 0 | 19.1 | 34.5 | 12.4 |
| PC, Mw = 30 KDa | 0.0 | 35 | 0 | 0.0 | 14.7 | 0.0 | 21.6 | 0 | 0 | 0 |
| PC, Mw = 22 KDa | 0.0 | 38.0 | 24 | 0.0 | 27.4 | 0.0 | 21.6 | 0 | 17.0 | 5.9 |
| PCTG | 25.0 | 26.3 | 0.0 | 15.0 | 15.0 | 20.0 | 26.3 | 42 | 0.0 | 0.0 |
| PCT | 0.0 | 0.0 | 25 | 0.0 | 0.0 | 0.0 | 0.0 | 0 | 28.5 | 42.0 |
| t-EXL (6 wt % siloxane) | 0.0 | 0.0 | 0.0 | 56.1 | 42.1 | 25.0 | 30.0 | 38.1 | 19.0 | 38.6 |
| Properties |  |  |  |  |  |  |  |  |  |  |
| MVR ISO at 265° C., 2.16 kg (cm$^3$/10 min) | 3.0 | 12 | 6.3 | 4.5 | 9.2 | 3.8 | 12 | 6.2 | 5.3 | 5.8 |
| % Transmission at 3.2 mm thickness | 87 | 88 | 86 | 83 | 84 | 85 | 86 | 84 | 84 | 84 |
| INI at 23° C. (J/m) | 980 | 760 | 700 | 950 | 910 | 1000 | 1000 | 960 | 909 | 917 |
| INI at 0° C. (J/m) | 130 | 110 | 95 | 940 | 800 | 860 | 825 | 910 | 405 | 168 |
| INI at −30° C. (J/m) | 80 | 75 | 75 | 580 | 545 | 180 | 150 | 125 | 120 | 150 |
| INI retention after 15 h annealing at 90° C. | 10% | 10% | 10% | 95% | 91% | 87% | 26% | 16% | 40% | 60% |
| INI retention after autoclave at 120° C. for 3.3 h | 10% | 10% | NM | 90% | NM | 94% | NM | N/A | NM | N/A |
| INI retention after autoclave at 120° C. for 6.7 h | 10% | 10% | NM | 90% | NM | 85% | NM | N/A | NM | N/A |
| Chemical resistance vs Formula 409* | NM | 0% | 0% | NM | NM | NM | NM | NM | 100% | 98% |

*% Retention in Tensile Elongation at Break after 2 days with 0.5% strain
NM—Not measured
N/A—Not applicable because heat deflection temperature at 66 psi is less than 120° C.

The invention compositions having t-EXL provide excellent initial INI, which remain very high, particularly the compositions with PCTG, when INI is measured at substantially reduced temperatures of 0° C. and −30° C. Additionally, after weights of 22 and 30 KDa. Example 10 corresponds to C6 in that it has a same percentage of polyester as C6, but lower molecular weight polycarbonate and 6% PC/siloxane block copolymer

TABLE 2

|  | Units | 8 | 9 | 10 | C4 | C5 | C6 |
|---|---|---|---|---|---|---|---|
| Components |  |  |  |  |  |  |  |
| PC, Mw = 18 KDa |  | 43.7 | 28.3 | 53.5 | 49.7 | 34.3 | 0 |
| PC, Mw = 22 KDa |  | 0 | 0 | 0 | 0 | 0 | 49.5 |
| PC, Mw = 30 KDa |  | 0 | 0 | 0 | 0 | 0 | 10.0 |
| PCCD 2000 poise |  | 49.7 | 65.0 | 39.8 | 49.7 | 65.0 | 39.8 |
| PC-siloxane copolymer |  | 6.0 | 6.0 | 6.0 | 0 | 0 | 0 |
| Properties |  |  |  |  |  |  |  |
| MVR ISO at 265° C., 2.16 kg | cm$^3$/10 min | 28.3 | 31.5 | 28.8 | 28.9 | 28.9 | 17.4 |
| MVR ISO at 220° C., 2.16 kg | cm$^3$/10 min | 5.7 | 2.9 | 5.5 | 4.8 | 4.3 | 3.1 |
| MVR ISO at 220° C., 5.00 kg | cm$^3$/10 min | 13.7 | 13.5 | 13.5 | 13.4 | 13.4 | 7.5 |
| MVR ISO at 240° C., 2.16 kg | cm$^3$/10 min | 12.6 | 13.4 | 12.6 | 12.9 | 13.3 | 7.1 |
| % Transmission at 2.5 mm thickness | % | 90.6 | 90.9 | 90.0 | 90.2 | 90.6 | 89.8 |
| % Haze at 2.5 mm thickness | % | 1.2 | 1.3 | 1.1 | 1.2 | 2.0 | 1.0 |
| INI at 0° C., 5 lbf/ft ductility | % | 40 | 80 | 0 | 0 | 0 | 0 |
| INI at 0° C., 5 lbf/ft Impact Strength | J/m | 462 | 982 | 130 | 101 | 117 | 107 |

TABLE 2-continued

| | Units | 8 | 9 | 10 | C4 | C5 | C6 |
|---|---|---|---|---|---|---|---|
| INI at 23° C., 5 lbf/ft Ductility | % | 80 | 100 | 100 | 100 | 100 | 100 |
| INI at 23° C., 5 lbf/ft Impact Strength | J/m | 915 | 1520 | 942 | 909 | 1380 | 905 |
| HDT at 0.45 MPa, 3.2 mm | ° C. | 91.7 | NM | NM | NM | NM | NM |
| HDT at 1.82 MPa, 3.2 mm | ° C. | 81.5 | 70.4 | 88.4 | 81.2 | 72.4 | 90.6 |

NM = Not measured

As can be seen from the data in Table 2, Examples 8, 9 and 10 had improved flow relative to Example C6: MVR at 265° C./2.16 Kg/240 s was improved by approximately 60% to 80%. At the same time, the impact properties were maintained or even improved. At 23° C., the Notch Izod Impact Strength (INI) of examples 8 ,9 and 10 were the same or higher than Example C6. At 0° C., examples 8 and 9 had even higher INI strength and maintained certain ductility (40% to 80%) while there is a total ductility loss in C6, and a much lower INI strength. Furthermore, the transparency (transmission and haze) of examples 8, 9, and 10 are very close to that of C6. Use of lower molecular weight polycarbonate in the blends accordingly provides increased flow.

A comparison of Examples 8 and 9 with C4 and C5, respectively, show that replacing polycarbonate with polyorganosiloxane/polycarbonate copolymer improved the low temperature impact property to an even greater extent, but also maintained the transparency of articles molded from the compositions. Comparing Example 8 with C4 and 9 with C5, the optical properties remained the same for the siloxane blends. Since transparency is important in applications such as cellular phone lens, it is desirable in these applications to maintain a lower percentage of polyorganosiloxane/polycarbonate copolymer (about 2 to about 20 wt %) in order to preserve a balance between attaining transparency and good impact properties.

The data in Table 2 further illustrate the importance of the polyorganosiloxane/polycarbonate copolymer in achieving good impact properties. The only difference between Examples 8 and 9, and Comparative Examples 4 and 5, respectively, is that the polyorganosiloxane/polycarbonate copolymer in Examples 8 and 9 with polycarbonate. It can be seen that all of four of these examples have the same flow properties as reflected by MVR. However, the low temperature impact (INI ductility at 0° C.) of Comparative Examples C4 and C5 is decreased in the absence of the copolymer compared to Examples 8 and 9. Furthermore, the impact property of example 10, which can be seen as obtained by replacing 90% higher molecular weight polycarbonate with low (<19K Da) molecular weight polycarbonate in C6 while in the presence of the copolymer, was retained similar at 23° C. and 0° C. as in C6, yet the melt flow property (MVR) was improved 65%, and the optical properties (transmission % and haze %) and HDT were retained similar.

Comparison of the MVR shift PC Mw shift, and PCCD Mw shift of the four blends in Table 3 shows that the blends containing the copolymer (Examples 8 and 9) have better hydrolytic stability than their counterparts without the copolymer (Comparative Examples 4 and 5). Due to experimental set-up difference, the weight average molecular weight (Mw) data in Table 3 were reported by polystyrene (PS) standard instead of Daltons (Da) as in the rest of the invention. The MVR was measured according to ISO 1133 (265° C./2.16 kg/240 seconds). All measurements were done on the granules with or without aging at 80° C./80 RH (relative humidity) for one to four weeks.

MVR increase in granules after hydrolytic aging is a sign of less hydrolytic stability or more chemical degradation of the polymers and therefore is undesirable. The degradation is also shown as decreases of the molecular weight of PC and/or polyester (PCCD). Examples 8 and 9 showed better hydrolytic stability than the comparative examples without the PC/polysiloxane block copolymer, C4 and C5, respectively. For example, after 4 weeks aging at 80° C./80 RH, C4 had nearly 400% of MVR increase while 8 had less than 100% MVR increase, also C4 retained 63% and 75% of the original Mw of PC and PCCD respectively while 8 retained 85% and 92% of the original Mw of PC and PCCD respectively. The comparison in Table 3 is further illustrated in FIG. 1, graphs A-E.

TABLE 3

| Weeks | 8 | C4 | 9 | C5 |
|---|---|---|---|---|
| | MVR (cm³/10 min)* | | | |
| 0 | 28.4 | 30.8 | 34.8 | 29.2 |
| 1 | 31.7 | 36.0 | 36.4 | 41.5 |
| 2 | 35.5 | 45.2 | 52.6 | 85.9 |
| 3 | 43.0 | 73.3 | 91.4 | 193.7 |
| 4 | 54.4 | 149.2 | 146.8 | 434.1 |
| MVR increase after 4 weeks aging at 80° C./80% RH | 92% | 384% | 322% | 1387% |
| | PC Mw** | | | |
| 1 | 35752 | 34211 | 34357 | 31813 |
| 2 | 34071 | 30183 | 31186 | 24968 |
| 3 | 31593 | 27120 | 24327 | 18615 |
| 4 | 30266 | 21614 | 21058 | 15596 |
| PC Mw retention after 4 weeks aging at 80° C./80% RH | 85% | 63% | 61% | 49% |
| | PCCD Mw** | | | |
| 1 | 90431 | 86000 | 84306 | 84224 |
| 2 | 83291 | 80851 | 81590 | 69795 |
| 3 | 83175 | 78152 | 72344 | 58149 |
| 4 | 83507 | 64477 | 63092 | 52996 |
| PCCD Mw retention after 4 weeks aging at 80° C./80% RH | 92% | 75% | 75% | 63% |

*MVR value of >200 cm³/10 min tend to have large variances. All MVR values were averaged from at least two test results.
**By Polystyrene standard according to GE method.

All references are incorporated herein by reference. The endpoints of all ranges directed to the same component or property are inclusive of the endpoint and independently combinable. Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition consisting essentially of, based on the total weight of polymer components in the composition:

about 3 to about 15 wt % of a polysiloxane polycarbonate block copolymer comprising repeating structural units of formula (I)

wherein at least 60 percent of the total number of $R^1$ groups are aromatic organic radicals and the balance thereof are aliphatic, alicyclic, or aromatic radicals, and repeating structural units of formula (IV) in an amount of about 1 to about 10 wt % based on total weight of the block copolymer

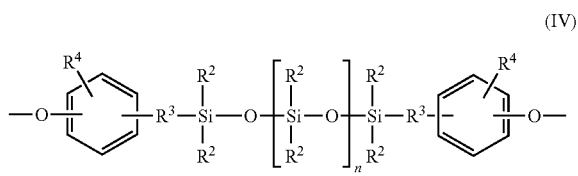

wherein $R^2$ is independently at each occurrence a monovalent organic radical having 1 to 13 carbon atoms, $R^3$ is a divalent aliphatic radical having 1 to 8 carbon atoms or an aromatic radical having 6 to 8 carbon atoms, $R^4$ is independently at each occurrence a hydrogen, halogen, alkoxy having 1 to 8 carbon atoms, alkyl having 1 to 8 carbon atoms, or aryl having 6 to 13 carbon atoms; and wherein n is an integer that is less than or equal to 1,000;

about 33 to about 77 wt % of a cycloaliphatic polyester having repeating units of formula (VI)

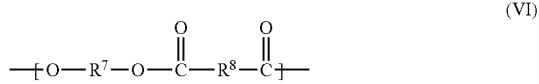

wherein $R^7$ and $R^8$ are independently at each occurrence a divalent aromatic, aliphatic or cycloaliphatic group having 2 to 20 carbon atoms, with the proviso that at least one of $R^7$ and $R^8$ is a cycloaliphatic group-containing radical; and about 17 to about 65 wt % of a polycarbonate that is different from the polycarbonate block copolymer, having a weight average molecular weight of less than about 20,000 Daltons, and that comprises repeating structural units of formula (XVIII)

wherein at least 60 percent of the total number of $R^9$ groups are aromatic organic radicals and the balance thereof are aliphatic, alicyclic, or aromatic radicals; and further wherein the composition has a melt volume rate of about 20 to about 40 cc/10 minutes, measured in accordance with ISO 1133 at 265° C. and 2.16 kg; and wherein the polycarbonate of the composition retains at least about 10% more of its initial molecular weight after aging for 28 days at 80° C., 80% relative humidity, compared to a composition without the polysiloxane polycarbonate block copolymer and wherein a sample molded from the composition is transparent and has a thickness of 3.2 mm has a Notched Izod impact strength of about 800 to about 1600 J/m, measured in accordance with ASTM D-256 at 23° C.

2. The composition of claim 1, comprising about 4 to about 7 wt % of the block copolymer, about 38 to about 70 wt % of the cycloaliphatic polyester, and about 25 to about 55 wt % of the polycarbonate.

3. The composition of claim 1, wherein a molded sample having a thickness of 3.2 mm has a Notched Izod impact strength of about 100 to about 1000 J/m, measured in accordance with ASTM D-256 at 0° C.

4. The composition of claim 1, wherein the polycarbonate of the composition retains at least about 15% of its molecular weight more after aging for 28 days at 80° C., 80% relative humidity, as compared to a composition without the polysiloxane polycarbonate block copolymer.

5. The composition of claim 1, wherein the polyester of the composition retains at least about 10% of its molecular weight more after aging for 28 days at 80° C., 80% relative humidity, as compared to a composition without the polysiloxane polycarbonate block copolymer.

6. The composition of claim 1, wherein an article molded from the composition and having a thickness of 2.5 mm has a haze of less than or equal to 5%, measured according to ASTM D1003-00.

7. The composition of claim 1, wherein an article molded from the composition and having a thickness of 2.5 mm has a transparency of greater than or equal to 80%, measured according to ASTM D1003-00.

8. The composition of claim 1, wherein a molded sample having a thickness of 3.2 mm has a heat deflection temperature of about 60 to about 90° C.

9. The composition of claim 1, wherein at least 60 wt % of the $R^1$ groups are radicals of the formula the formula (XIX)

$$-A^3-Y^2-A^4- \qquad (XIX)$$

wherein each of $A^3$ and $A^4$ is a monocyclic divalent aryl radical and $Y^2$ is —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, adamantylidene, or a combination comprising at least one of the foregoing groups, and further wherein $R^2$ is independently at each occurrence a monovalent organic radical having 1 to 4 carbon atoms, $R^3$ is a divalent aliphatic radical having 3 to 8 carbon, and n is an integer of about 10 to about 100.

10. The composition of claim 9, wherein each of $A^3$ and $A^4$ is phenylene and $Y^2$ is isopropylidene, and further wherein $R^2$ is methyl, $R^3$ is a divalent aliphatic radical having 3 to 8 carbon atoms, and n is an integer of about 40 to about 60.

11. The composition of claim 1, wherein both $R^7$ and $R^8$ are cycloalkyl-containing radicals.

12. The composition of claim 1, wherein $R^8$ is derived from 1,4-cyclohexyl dicarboxylic acid with greater than about 70 mole % thereof in the form of the trans isomer and $R^7$ is derived from 1,4-cyclohexyl dimethanol with greater than about 70 mole % thereof in the form of the trans isomer.

13. The composition of claim 1, wherein $R^9$ comprises at least 60 wt % of units of the formula (XX)

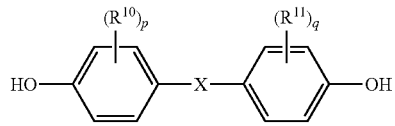
(XX)

wherein $R^{10}$ and $R^{11}$ independently at each occurrence are a halogen atom or a monovalent hydrocarbon group; p and q are each independently integers from 0 to 4; and X represents one of the groups of formula (XXI) or (XXII)

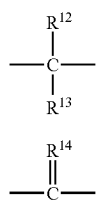
(XXI)

(XXII)

wherein $R^2$ and $R^{13}$ independently at each occurrence are a hydrogen atom or a monovalent linear or cyclic hydrocarbon group having 1 to 8 carbons and $R^{14}$ is a divalent hydrocarbon group having 1 to 8 carbons.

14. The composition of claim 13, wherein X is isopropylidene and p and q is each zero.

15. A method of manufacture of the composition of claim 1, comprising melt blending the components of the composition of claim 1.

16. A method of forming an article, comprising injection molding, extrusion, injection blow molding, gas assist blow molding, or vacuum forming the composition of claim 1 to form the article.

17. An article comprising the composition of claim 1, wherein the article is transparent.

18. The article of claim 17, wherein the article is an extruded or injection molded article.

19. The article of claim 17, wherein the article is a transparent component of a hand-held electronic device.

20. The article of claim 17, wherein the hand-held electronic device is a component of a cellular telephone.

21. The article of claim 17, in the form of a lens for a cellular telephone.

22. The composition of claim 1, wherein both $R^7$ and $R^8$ are cycloalkyl-containing radicals independently selected from the following formulae (VII) to (XVI)

(VII)

(VIII)

(IX)

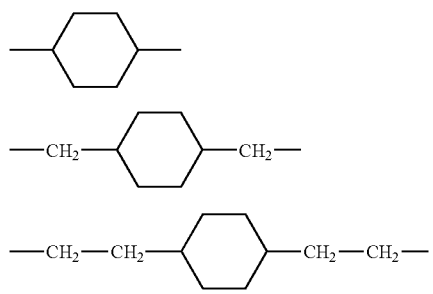

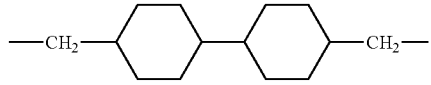
(X)

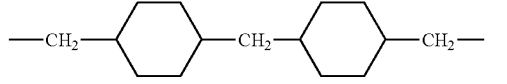
(XI)

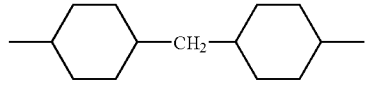
(XII)

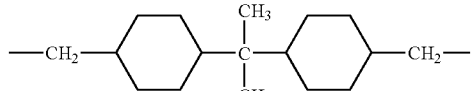
(XIII)

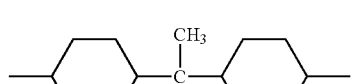
(XIV)

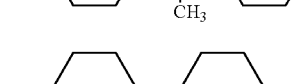
(XV)

(XVI)

23. The composition of claim 1, wherein the polysiloxane polycarbonate block copolymer consists essentially of the repeating structural units of formula (I) and repeating structural units of formula (IV).

24. The composition of claim 1, wherein the wt % of the polysiloxane polycarbonate block copolymer, the cycloaliphatic polyester, and the polycarbonate that is different from the polycarbonate block copolymer add up to 100 wt %.

25. The composition of claim 1, wherein the composition has a soft phase content of 0.03 to 1.5 wt %.

26. A composition consisting essentially of, based on the total weight of polymer components in the composition,
about 3 to about 15 wt % of a polysiloxane polycarbonate block copolymer comprising
repeating structural units of formula (I)

(I)

wherein at least 60 percent of the total number of $R^1$ groups are aromatic organic radicals and the balance thereof are aliphatic, alicyclic, or aromatic radicals, and repeating structural units of formula (IV) in an amount of about 1 to about 10wt % based on total weight of the block copolymer

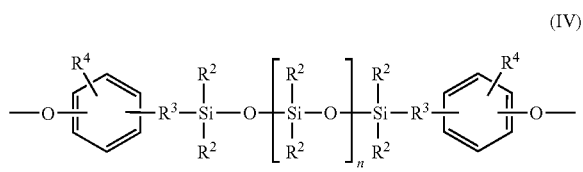

(IV)

wherein $R^2$ is independently at each occurrence a monovalent organic radical having 1 to 13 carbon atoms, $R^3$ is a divalent aliphatic radical having 1 to 8 carbon atoms or an aromatic radical having 6 to 8 carbon atoms, $R^4$ is independently at each occurrence a hydrogen, halogen, alkoxy having 1 to 8 carbon atoms, alkyl having 1 to 8 carbon atoms, or aryl having 6 to 13 carbon atoms and n is an integer that is less than or equal to 1,000;

about 33 to about 77 wt % of a cycloaliphatic polyester having repeating units of formula (VI)

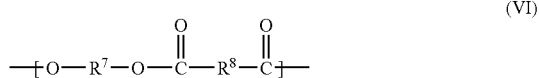

(VI)

wherein $R^7$ and $R^8$ are independently at each occurrence a cycloaliphatic group-containing radical having from 5 to 20 carbon atoms; and about 17 to about 65 wt % of a polycarbonate that is different from the polycarbonate block copolymer, having a weight average molecular weight of less than about 20,000 Daltons, and that comprises repeating structural units of formula (XVIII)

(XVIII)

wherein at least 60% of the $R^9$ groups are derived from a bisphenol of formula (XX)

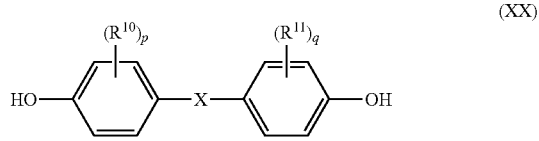

(XX)

wherein $R^{10}$ and $R^{11}$ independently at each occurrence are a halogen atom or a monovalent hydrocarbon group, p and q are each independently integers from 0 to 4, and X represents one of the groups of formula (XXI) or (XXII)

(XXI)

(XXII)

wherein $R^{12}$ and $R^{13}$ independently at each occurrence are a hydrogen atom or a monovalent linear or cyclic hydrocarbon group having 1 to 8 carbons and $R^{14}$ is a divalent hydrocarbon group having 1 to 8 carbons; and further wherein the composition has a melt volume rate of about 24 to about 35 cc/10minutes, measured in accordance with ISO 1133 at 265° C. and 2.16 kg;

the polycarbonate of the composition retains at least about 10% more of its initial molecular weight after aging for 28 days at 80° C., 80% relative humidity, as compared to a composition without the polysiloxane polycarbonate block copolymer; and a sample molded from the composition is transparent and has a thickness of 3.2 mm has a Notched Izod impact strength of about 800 to about 1600 J/m, measured in accordance with ASTM D-256 at 23° C.

27. A composition consisting essentially of, based on the total weight of polymer components in the composition, about 4 to about 7 wt % of a polysiloxane polycarbonate block copolymer consisting essentially of
repeating structural units of formula (I)

(I)

wherein at least 60 wt % of the $R^1$ groups are derived from bisphenol A;

repeating structural units of formula (IV)

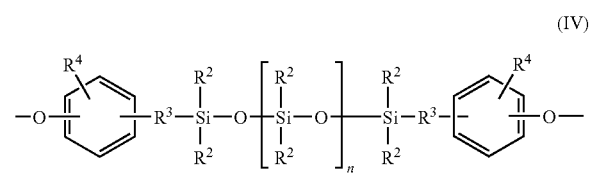

(IV)

wherein $R^2$ is independently at each occurrence a methyl, trifluoropropyl, or phenyl, $R^3$ is propylene, $R^4$ is methoxy, and n is an integer that is less than or equal to 1,000;

about 38 to about 70 wt % of poly(1,4-cyclohexane-dimethanol-1,4-dicarboxylate); and about 25 to about 55 wt % of a polycarbonate that is different from the polycarbonate block copolymer, having a weight average molecular weight of less than about 19,000 Daltons, and that comprises repeating structural units of formula (XVIII)

(XVIII)

wherein at least 60 percent of the total number of $R^9$ groups are derived from bisphenol A; and further wherein the composition has a melt volume rate of about 24 to about 35 cc/10 minutes, measured in accordance with ISO 1133 at 265° C. and 2.16 kg; and the polycarbonate of the composition retains at least about 10% more of its initial molecular weight after aging for 28 days at 80° C., 80% relative humidity, as compared to a composition without the polysiloxane polycarbonate block copolymer; and a sample molded from the composition is transparent and has a thickness of 3.2 mm has a Notched Izod impact strength of about 800 to about 1600 J/m, measured in accordance with ASTM D-256 at 23° C.

28. A composition consisting essentially of, based on the total weight of polymer components in the composition:
about 19.0 to about 56.1 wt % of a polysiloxane polycarbonate block copolymer comprising
repeating structural units of formula (I)

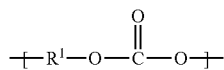

(I)

wherein at least 60 percent of the total number of $R^1$ groups are aromatic organic radicals and the balance thereof are aliphatic, alicyclic, or aromatic radicals, and repeating structural units of formula (IV) in an amount of about 1 to about 10wt % based on total weight of the block copolymer

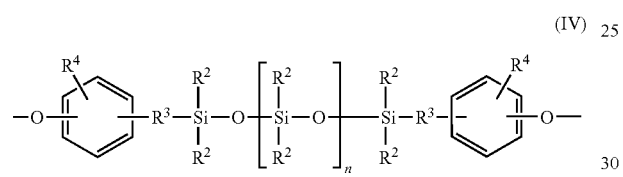

(IV)

wherein $R^2$ is independently at each occurrence a monovalent organic radical having 1 to 13 carbon atoms, $R^3$ is a divalent aliphatic radical having 1 to 8 carbon atoms or an aromatic radical having 6 to 8 carbon atoms, $R^4$ is independently at each occurrence a hydrogen, halogen, alkoxy having 1 to 8 carbon atoms, alkyl having 1 to 8 carbon atoms, or aryl having 6 to 13 carbon atoms; and wherein n is an integer that is less than or equal to 1,000;

about 15.0 to about 42 wt % of a cycloaliphatic polyester having repeating units of formula (VI)

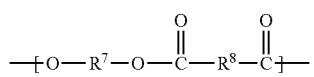

(VI)

wherein $R^7$ and $R^8$ are independently at each occurrence a divalent aromatic, aliphatic or cycloaliphatic group having 2 to 20 carbon atoms, with the proviso that at least one of $R^7$ and $R^8$ is a cycloaliphatic group-containing radical; and about 12.4 to about 54.2 wt % of a polycarbonate that is different from the polycarbonate block copolymer, having a weight average molecular weight of less than about 20,000 Daltons, and that comprises repeating structural units of formula (XVIII)

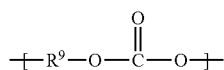

(XVIII)

wherein at least 60 percent of the total number of $R^9$ groups are aromatic organic radicals and the balance thereof are aliphatic, alicyclic, or aromatic radicals; and further wherein the composition has a melt volume rate of about 3.8 to about 12 cc/10 minutes, measured in accordance with ISO 1133 at 265° C. and 2.16 kg; and wherein the polycarbonate of the composition retains at least about 10% more of its initial molecular weight more after aging for 28 days at 80° C., 80% relative humidity, compared to a composition without the polysiloxane polycarbonate block copolymer and wherein a sample molded from the composition is transparent and has a thickness of 3.2 mm has a Notched Izod impact strength of about 800 to about 1600 J/m, measured in accordance with ASTM D-256 at 23° C.

29. A composition comprising a polymer component, wherein the polymer component consists of, based on the total weight of polymer components in the composition:
about 3 to about 15 wt % of a polysiloxane polycarbonate block copolymer comprising
repeating structural units of formula (I)

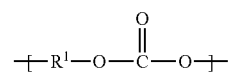

(I)

wherein at least 60 percent of the total number of $R^1$ groups are aromatic organic radicals and the balance thereof are aliphatic, alicyclic, or aromatic radicals, and repeating structural units of formula (IV) in an amount of about 1 to about 10wt % based on total weight of the block copolymer

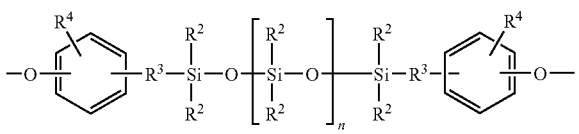

(IV)

wherein $R^2$ is independently at each occurrence a monovalent organic radical having 1 to 13carbon atoms, $R^3$ is a divalent aliphatic radical having 1 to 8 carbon atoms or an aromatic radical having 6 to 8 carbon atoms, $R^4$ is independently at each occurrence a hydrogen, halogen, alkoxy having 1 to 8 carbon atoms, alkyl having 1 to 8 carbon atoms, or aryl having 6to 13 carbon atoms; and wherein n is an integer that is less than or equal to 1,000;

about 33 to about 77 wt % of a cycloaliphatic polyester having repeating units of formula (VI)

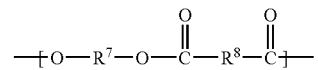

(VI)

wherein R7 and R8 are independently at each occurrence a divalent aromatic, aliphatic or cycloaliphatic group having 2 to 20 carbon atoms, with the proviso that at least one of R7 and R8 is a cycloaliphatic group-containing radical; and about 17 to about 65 wt % of a polycarbonate that is different from the polycarbonate block copolymer, having a weight average molecular weight of less than about 20,000 Daltons, and that comprises repeating structural units of formula (XVIII)

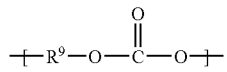

(XVIII)

wherein at least 60 percent of the total number of R9 groups are aromatic organic radicals and the balance thereof are aliphatic, alicyclic, or aromatic radicals; and further wherein the composition has a melt volume rate of about 20 to about 40 cc/10 minutes, measured in accordance with ISO 1133 at 265° C. and 2.16 kg, wherein the polycarbonate of the composition retains at least about 10% more of its initial molecular weight more after aging for 28 days at 80° C., 80% relative humidity, compared to a composition without the polysiloxane polycarbonate block copolymer, and wherein a sample molded from the composition is transparent and has a thickness of 3.2 mm has a Notched Izod impact strength of about 800 to about 1600 J/m, measured in accordance with ASTM D-256 at 23° C.

* * * * *